Oct. 31, 1972

A. R. BOGSTEN 3,701,606

DRILL, PARTICULARLY A SO-CALLED DEEP
HOLE DRILL OR GUN BORING DRILL

Filed June 29, 1970

INVENTOR.
ANDERS RICHARD BOGSTEN
BY
Young + Thompson
ATTYS.

Oct. 31, 1972   A. R. BOGSTEN   3,701,606
DRILL, PARTICULARLY A SO-CALLED DEEP
HOLE DRILL OR GUN BORING DRILL
Filed June 29, 1970

INVENTOR.
ANDERS RICHARD BOGSTEN
BY
Young + Thompson
ATTYS.

United States Patent Office 3,701,606
Patented Oct. 31, 1972

3,701,606
DRILL, PARTICULARLY A SO-CALLED DEEP HOLE DRILL OR GUN BORING DRILL
Anders Richard Bogsten, Jarnagatan 6A, Sodertalje, Sweden
Filed June 29, 1970, Ser. No. 50,716
Claims priority, application Sweden, July 15, 1969, 9,975/69; Sept. 1, 1969, 12,068/69
Int. Cl. B23b 51/06
U.S. Cl. 408—59     11 Claims

ABSTRACT OF THE DISCLOSURE

A drill, particularly a gun boring drill, comprising a drill tube provided with two internal axial flow channels separated by a partition wall having its side edges located at two spaced positions along the inner circumference of the drill tube, one channel being intended for supply of flushing medium and the other channel for discharge of borings together with flushing medium.

---

Figure 1:
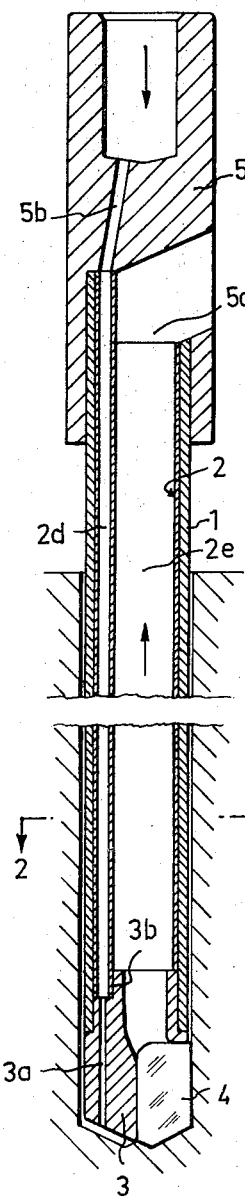

The present invention relates to a drill, particularly a so-called deep hole drill or gun boring drill, comprising a drill tube, at least one cutting means supporting a hard metal cutting bit and being mounted at one end of the drill tube, and an axially extending partition member inserted into the drill tube so as to separate two axial flow channels for supplying flushing medium through one channel to the cutting means for lubricating and cooling the same and discharging flushing medium together with borings through the other channel.

In order to obtain optimal cutting ability when using drills of the type referred to for drilling long holes it is necessary to provide for good cooling and lubrication of the cutting means and effective removal of the borings. Cooling, lubrication and removal of borings is effected with a flushing medium comprising oil or an emulsion thereof and normally supplied to the cutting means under a relatively high pressure, whereafter the flushing medium under the influence of said pressure is conducted away from the workpiece together with the cut borings.

There are two main types of drills for drilling long holes known to the art. One type of drill has an internal oil supply means and external means, for removal of borings, while the other type of drill has external oil supply means and internal means for removing said borings. The former type is the one most commonly used and can be designed for relatively small diameters. When seen in cross section, such a drill is sector shaped having an angle of aperture of approximately 100° for the removal of borings. With drills of this type with which the cutting means is mounted on a drill head secured in the end of the drill tube, the drill head is provided with an axially through passing hole which opens out on the clearance side of the cutting bit. This type of gun boring drill presents no sealing problem, although the removal of borings therefrom can be considered less satisfactory, since the borings when departing from the workpiece deleteriously affects the machined cylindrical surface of the bore. Furthermore, drills of this type are much weaker than the drills belonging to the other main category of gun boring drills.

These latter drills have a circular tubular cross section and are provided, as aforementioned, with internal means for removing borings and external oil supply means. A superior finish is obtained on the machined surface when using drills of this latter category, and it is also possible to work at a slightly higher drill feed rate than when using drills of the first mentioned type. Sealing of the supply line for flushing medium against the workpiece, however, is a serious problem in said latter type of drill and, as a rule, requires a hermatetic seal to be arranged in order to obtain the intended function.

It should also be mentioned in this connection that it is known from U.S. Pat. No. 3,304,815 to provide a drill with two interengaging concentric tubes, whereby a cylinder-annular channel is formed between the outer and inner tube. Flushing media is intended to be supplied through said passage during a working operation and to be removed together with borings through the insert tube. A drill designed in this manner with two axially concentrical passages is intended for drilling long holes with relatively large diameters. The major portion of the flushing medium is conducted via outlet openings on the side of a drill head secured in the outer tube to the cutting means along the periphery of the drill, while a portion of the flushing medium is passed through openings into the insert tube and promotes a rearwardly directed ejector effect therein. As a result, the pressure required to supply the flushing medium can be reduced in relation to the pressure required with the two aforementioned main types of gun boring drills, and the need for arranging a seal against the workpiece is obviated in this latter type of drill.

On the other hand, if it is desired to design this latter drill without the ejector action for removing borings, it would also be necessary to apply a higher pressure to the flushing medium and to provide good sealing against the workpiece, since the flushing medium is conducted radially away from the outer tube.

The object of the present invention is to eliminate these disadvantages associated with known drills for boring long holes and the invention relates to a novel design of a drill which permits both internal supply of oil and internal removal of borings.

The drill according to the invention is characterized in that the partition member is a axially extending wall having its two opposite edge portions located at two spaced positions along the inner circumference of the drill tube to provide said two spaced axial channels.

In its simplest form the partition member may consist of a metal strip sealed at its edges to the inside of the drill tube. However, the portion member is preferably extended at its edges with curved side portions which rest against the inside of the drill tube and provide a reinforcing member in the drill tube. In one embodiment of the invention the two side portions extend in the same direction along the inner circumference of the drill tube to join the opposite side edges of the partition wall so that the curved side portions will form together a closed insert tube having two axial channels separated by the axial partition wall.

In another preferred embodiment the curved side portions are extended in opposite directions towards each other and form together with the partition wall an insert tube. In this simple embodiment, one axial channel will be formed within the insert tube and the other axial channel will be defined by the outside of the partition wall and the opposite portion of the inside of the drill tube. This embodiment enables a simple manufacture and may be used for drill tubes having a relatively small inner diameter. In the case of drills in which the drill head is threaded securely in the outer drill tube, the insert tube has preferably a loose fit in the drill tube, whereby the insert tube can be readily fitted into a recess corresponding to the shape of the end of said tube and arranged in the drill head, while in the case of drills in which the drill head is fixedly mounted the insert tube has preferably a fixed fit in the drill tube.

A drill constructed in accordance with the invention is much stronger than previously known drills for long holes and as a result thereof the thickness of the tube can be made thinner than with other long hole drills. Furthermore, the construction of the insert tube permits a drill head connected to the outer tube to be provided with one or more axially through-passing holes to the cutting means, whereby the flushing medium obtains an expedient direction of flow.

Two embodiments of a gun boring drill in accordance with the invention will now be described in detail with reference to the accompanying drawing.

Figure 2:
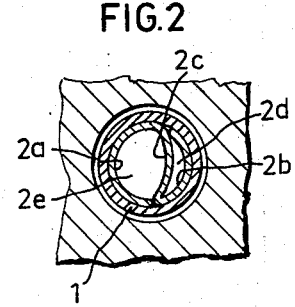
Figure 4:
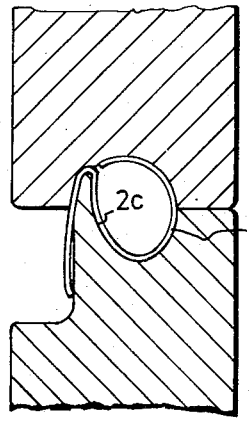
Figure 5:
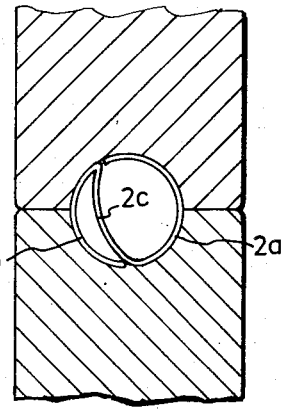
Figure 6:
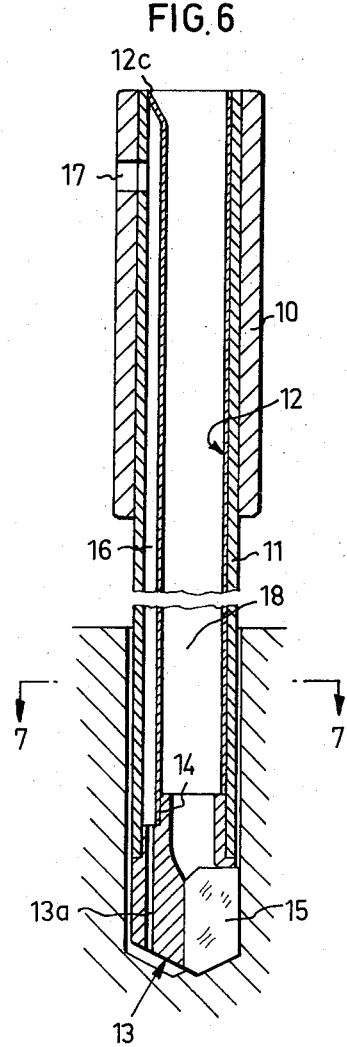
Figure 7:
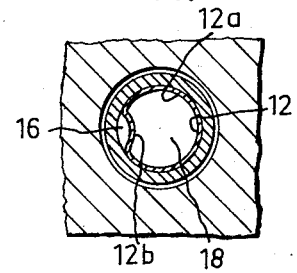

FIG. 1 is a sectional view of one embodiment of the drill in a working position in a hole in a work-piece, FIG. 2 shows a section of the drill taken along the line 2—2 in FIG. 1 and FIGS. 3–5 illustrate the manufacture of the insert tube in three different working operations, FIG. 6 is a sectional view of the other embodiment of the drill in a working position, and FIG. 7 is a cross-section along line 7—7 in FIG. 6.

The drill shown in FIG. 1 comprises an external drill tube 1, an insert tube 2, a drill attachment means 5 and a drill head 3, to which is secured in a conventional manner at least one cutting means 4. The cutting means 4 consists of a hard metal cutting bit and may alternatively, in accordance with a modified form of the embodiment shown in FIG. 1, be directly welded or soldered to the end of the drill tube 1, thus obviating the necessity of drill head 3.

In the illustrated embodiment in FIGS. 1–5, the drill head 3 has a shouldered neck portion and fits into and is secured to the outer end of the drill tube 1. The inner tube 2 is mounted with a firm fit in the outer drill tube 1 and abuts the drill head 3. Alternatively, the drill head 3 may be secured in the drill tube as by threads, in which case the inner tube 2 has preferably a loose fit in the drill tube 1. The manner in which the insert tube 2 and the drill head 3 are connected can take a number of different forms, and FIG. 1 shows by way of example how the inner tube 2 engages in a recess 3b corresponding to the shape of the end of the tube 2 and arranged in the inner neck end of the drill head 3.

The inner tube 2 has a cylindrical external shape and is divided into two curved side portions 2a, 2b which are semi-cylindrical and together enclose two axially extending passages or channels 2d, 2e which are separated by a partition wall 2c. The partition wall 2c and the curved side portions 2a, 2b are produced from a blank, the two longitudinal extending edge surfaces of which are curved towards each other to form the cylindrical shape of the insert tube 2. The channels 2d, 2e are preferably of different size, the smaller, 2d, of which channels is intended for supplying oil and the larger, 2e, for discharging the borings. When the insert tube 2 is loosely fitted in the drill tube 1, extra sealing of the tube joints can be provided by welding or soldering respective edge surfaces or solely the edge surface which forms the flushing medium supply channel 2d of the insert tube 2.

When fitting the insert tube 2 and the drill head 3 in the drill tube 1 they should be rotated relative to each other so that one or more axially extending through-passing holes 3a disposed in the drill head 3 and opening out on the clearance side of the cutting means 4 communicate with the flushing medium supply channel 2d of the insert tube 2.

At the other end, the drill tube 1 engages in the drill attachment means 5, and the channel 2e for removal of borings is arranged in said drill tube 1 and registers with a passage 5a for removal of borings and arranged in the drill attachment means 5. The channel 2d in the insert tube 2 for conducting flushing medium to the cutting means has a longer axial extension than the channel 2e and connects with an inner passage 5b arranged in the drill attachment means 5 and adapted to conduct the flushing medium.

When constructed in accordance with the concept of the present invention, the insert tube 2 is pressed into abutment with the inner cylindrical surface of the drill tube 1 along its length, whereby the drill tube 1 as a whole is reinforced and makes it possible to reduce the thickness of the walls of the two tubes in relation to what would otherwise be the case.

Figure 3:
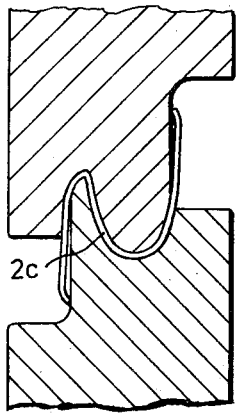

In accordance with the concept of the invention, the insert tube 2 may be given the illustrated configuration by means of a number of working operations, of which FIGS. 3–5 illustrate three different working stakes when using a pressing or rolling tool. The partition wall 2c is formed in the first working operation while in the second operation the curved side portion 2a is formed and in the third operation the curved side portion 2b is curved to its final form.

The second embodiment of the invention shown in FIGS. 6 and 7 consists of a drill attachment means 10, an external drill tube 11, an insert tube 12 and a drill head 13. The drill tube 11 is secured at one end in the drill attachment means 10 and at the other end is fitted to the drill head 13, which is provided with a stepped neck portion, to provide a recess 14. Second in a conventional manner, alternatively detachably, to the drill head 13 is at least one hard metal means 15, although with a modified embodiment of the invention it is also possible to secure the cutting means 4 directly to the end of the drill tube 11, thereby obviating the necessity of a drill head.

The inner tube 12 is mounted with a firm fit in the outer drill tube 11, and abuts against the drill head 13. Alternatively, the drill head 13 may be screwed securely in the drill tube 11, wherewith in such case the inner tube 12 preferably has a loose fit in the drill tube 1.

The manner in which the insert tube 12 and the drill head 13 are connected can be effected in a number of different ways, and FIG. 6 shows an example how the inner tube 12 engages in the recess 14 corresponding to the shape of the end of the tube 12 and arranged in the inner neck end of the drill head 13.

The inner tube 12 has a substantially cylindrical external shape along the major portion 12a of its circumference and includes for the rest an inwardly directed bulge 12b extending along the tube, and forming a furrow or groove which may alternatively be axial or made to extend helically. The depth of the groove becomes successively shallower at the end of the insert tube 12 remote from the drill head 13 to merge into the circular end 12c of the insert tube 12. The end of the insert tube 12 can be additionally sealed against the drill tube 11, should it be so desired, by soldering or welding.

A groove formed in the aforedescribed manner provides an axial channel 16 between the bulge 12b of the insert tube 12 and the inside of the drill tube 1, through which channel 16 a flushing medium is adapted to be passed to the cutting means 15 during a working operation. To this end, the upper portion of the drill is provided with a radial inlet hole 17 which passes through both the drill attachment means 10 and the drill tube 11. Supply pipes are connected to the inlet opening 17 in a manner known per se and hence no description is necessary.

The outlet end of the channel 16 with the inert tube 12 abutting the inner neck end of the drill head 13 is adapted to connect with at least one axially through passing opening 13a in the drill head 13, through which flushing medium is passed directly to the clearance side of the cutting means 15.

A flushing medium supplied under high pressure in the aforedescribed manner is conducted away together with the borings from a drill hole cut in a workpiece through the insert tube 12, which thus forms a second axial channel 18. In the case of a drill constructed in accordance with the illustrated embodiment the outlet is completely straight, which facilitates transport of the borings.

As will be understood from the above the bulge 12b of the tube 12 forms a partition wall between the two axial channels 16 and 18.

In the case of an insert tube 12 constructed in accordance with the concept of the invention, said tube is pressed into abutment with the inner cylindrical surfaces of the drill tube 11 along its length, whereby the entire drill tube 11 is reinforced. Furthermore, the illustrated insert tube 12 simplifies manufacture and is preferably formed by rolling. As a result hereof, the dimension of the tube 12 can be further reduced, thereby enabling drills constructed in accordance with the invention to be used for smaller hole diameters than the drills constructed in accordance with the embodiment shown in FIG. 1.

The invention is not restricted to the illustrated embodiment but can be modified within the scope of the following claims. Thus, it is possible to provide the insert tube 12 with a square or other polygonal cross section and to use a drill tube 11 which has a shape other than circular cross section.

What I claim is:

1. A metalworking drill, particularly a so-called deep hole drill or gun boring drill, comprising a drill tube, at least one cutting means supporting a hard metal cutting bit and being mounted at one end of the drill tube, and an axially extending partition member inserted into the drill tube so as to separate two axial flow channels for supplying flushing medium through one channel to the cutting means for lubricating and cooling the same and discharging flushing medium together with borings through the other channel characterized in that the partition member is an axially extending wall having its two opposite edge portions located at two spaced positions along the inner circumference of the drill tube to provide said two separated axial channels, the partition wall extending at both its side edges with curved side portions positioned along the inner circumference of the drill tube, both curved side portions extending in one and the same direction along the inner circumference of the drill tube and form together an insert tube divided into two axial channels by said partition wall.

2. A drill according to claim 1, characterized in that the insert tube is constructed from a blank with its opposite edge portions curved towards each other to form a tube enclosing the two axial channels separated by the partition wall.

3. A drill according to claim 1, characterized in that a drill head is screwed into the drill tube and that the insert tube is mounted in the drill tube with a loose fit, and that the insert tube is fitted with its end into a recess in the drill head corresponding to the shape of the end of the insert tube.

4. A drill according to claim 1, characterized in that the drill head is fixedly mounted in the drill tube and that the insert tube has a firm fit in the drill tube.

5. A drill according to claim 2, characterized in that at least the edge portion of the blank which forms the flushing medium supply channel of the insert tube is sealed as by welding or soldering.

6. A drill according to claim 1, characterized in that a drill head is secured in the drill tube and that the drill head is provided with at least one axially through-passing hole which connects with the flushing medium supply channel of the insert tube.

7. A drill according to claim 1, characterized in that the curved side portions of the partition wall extend in opposite directions towards each other and meet to form an insert tube and the insert tube is fitted in the drill tube with direct abutment against the inner cylindrical surface of the drill tube to provide an axial channel between the outside of the partition wall portion of the insert tube and the opposite portion of the inside of the drill tube, and a second axial channel in the insert tube.

8. A drill according to claim 7, characterized in that the drill tube is cylindrical and that the insert tube has a polygonal cross section.

9. A drill according to claim 7, characterized in that the drill tube has a circular cross-section and that the insert tube has an irregular cross section along its length, presenting at least one inwardly directed bulge in a periphery which in its other portions is cylindrical.

10. A drill according to claim 7, characterized in that the drill has a drill head secured in the drill tube and that the drill head is provided with at least one axially through-passing channel connected with the flushing medium supply channel formed by the insert tube in the drill tube.

11. A drill according to claim 1, characterized in that the partition wall along both of its side edges forms obtuse angles with the inner circumference of the drill tube on the same side as said other channel.

References Cited

UNITED STATES PATENTS

| 3,287,998 | 11/1966 | Goernert et al. | 408—59 |
| 3,304,815 | 2/1967 | Faber | 408—59 |

FOREIGN PATENTS

| 57,448 | 1/1937 | Norway | 408—57 |
| 428,379 | 7/1965 | Switzerland | 408—57 |

FRANCIS S. HUSAR, Primary Examiner